Oct. 4, 1960 C. W. HAMMAR 2,954,834
FLUID DRIVE FOR VEHICLES
Filed Jan. 22, 1959 3 Sheets-Sheet 1

INVENTOR.
Carl W. Hammar
BY

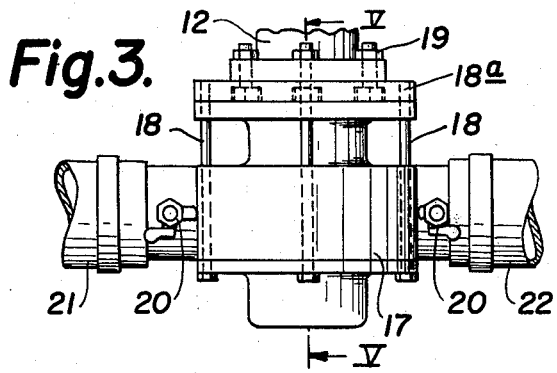
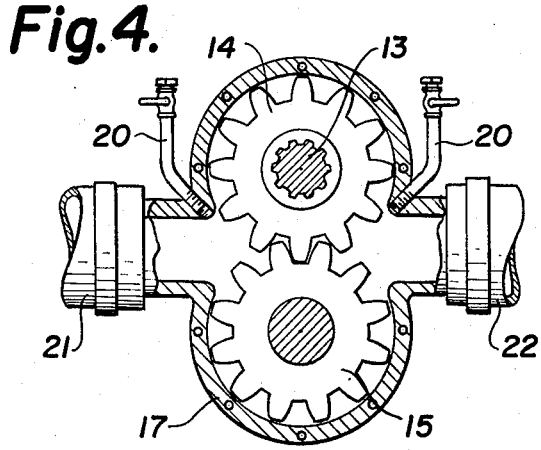
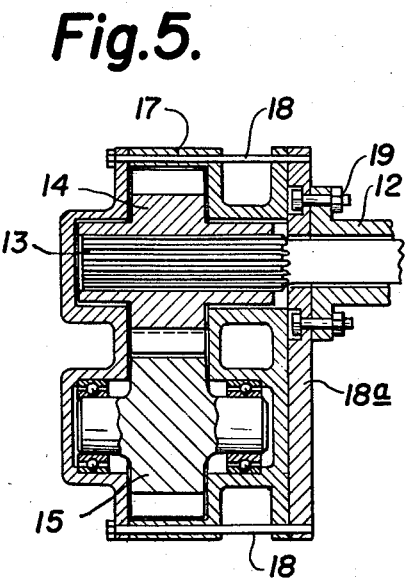
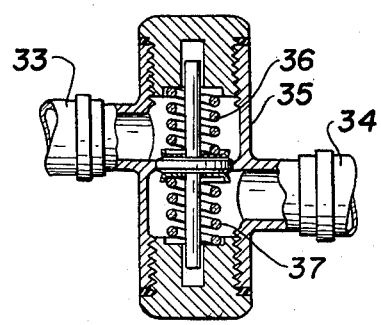

Oct. 4, 1960  C. W. HAMMAR  2,954,834
FLUID DRIVE FOR VEHICLES
Filed Jan. 22, 1959  3 Sheets-Sheet 3

INVENTOR.
Carl W. Hammar
BY Archworth Martin

United States Patent Office 2,954,834
Patented Oct. 4, 1960

2,954,834
FLUID DRIVE FOR VEHICLES
Carl W. Hammar, 112 Ziegler Ave., Butler, Pa.

Filed Jan. 22, 1959, Ser. No. 788,339

1 Claim. (Cl. 180—66)

The invention comprises a pump for placing a fluid, and particularly a liquid, under compression, for driving an impeller that has driving connection with a shaft that suitably may be the shaft of a differential gear pinion, at the rear axle of an automobile.

One object of my invention is to provide a transmission of the fluid drive type, from the usual change-speed and reversing transmission gears at the front of a vehicle chassis to the differential gear at the rear end of the vehicle chassis, the arrangement being such that the fluid drive apparatus can readily be incorporated into automobiles of various standard forms, without substantial alterations in the present driving mechanisms other than removal of the present long transmission shafts and the universal joints.

Another object of my invention is to provide a fluid drive system and apparatus of such form as to require much smaller vertical space than present standard forms of transmission apparatus, thus avoiding the necessity of providing recesses in the vehicle floor for universal joints.

Another object of my invention is to provide a bypass controlled by a relief valve, operable to prevent excessive strains on the driving mechanism when the pressure in the fluid supply lines to the impeller exceeds a predetermined degree.

A suitable pump for my purpose comprises two gear wheels that intermesh with one another within a pump casing that has openings in opposite sides, for the circulation of fluid through pipes that are disposed alongside vehicle side frames or within the channels of some types of vehicle side frames and are connected to opposite sides of a casing that contains an impeller.

The system can be applied to various standard models of automobiles, without substantial changes other than the elimination of the usual transmission shaft and connection of the gear pump to the driving shaft of the transmission gears, in the place usually occupied by the universal joint.

The gear pump casing is connected to the rear end of the gear case that contains the transmission gears. The gear pump, because of the presence of the conventional reversible transmission gearing can be driven in either direction, to drive the vehicle forwardly or move it rearwardly.

The impeller is of the flat vane type and will be driven by pressure from conduits or line pipes along the sides of the auto frame, the fluid flow being into one side of the impeller casing and out the other side thereof, from and to the inlet and outlet sides of the gear pump casing.

In the accompanying drawings:

Fig. 3 is an enlarged plan view of the pump casing of Fig. 1 and certain of its associated parts.

Fig. 4 is a sectional view through the pump gearing of Fig. 3.

Fig. 5 is a view taken on the line V—V of Fig. 3.

Fig. 9 is a sectional view through the by-pass relief valve of Fig. 1.

Figure 1:
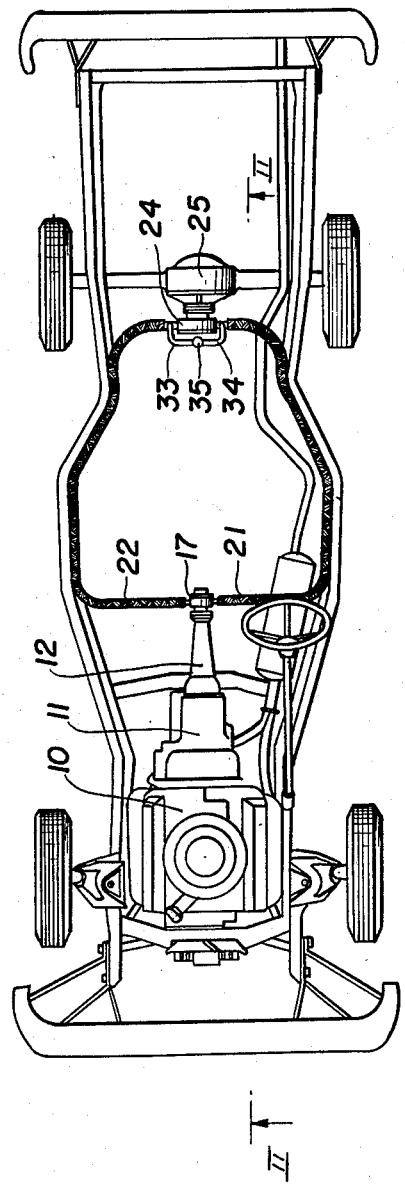
Figure 1 is a plan view of a vehicle chassis with my apparatus applied thereto.
Figure 2:
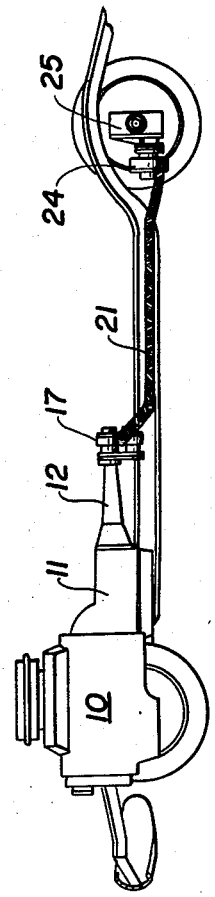
Fig. 2 is a view taken on the line II—II of Fig. 1.
Figure 6:
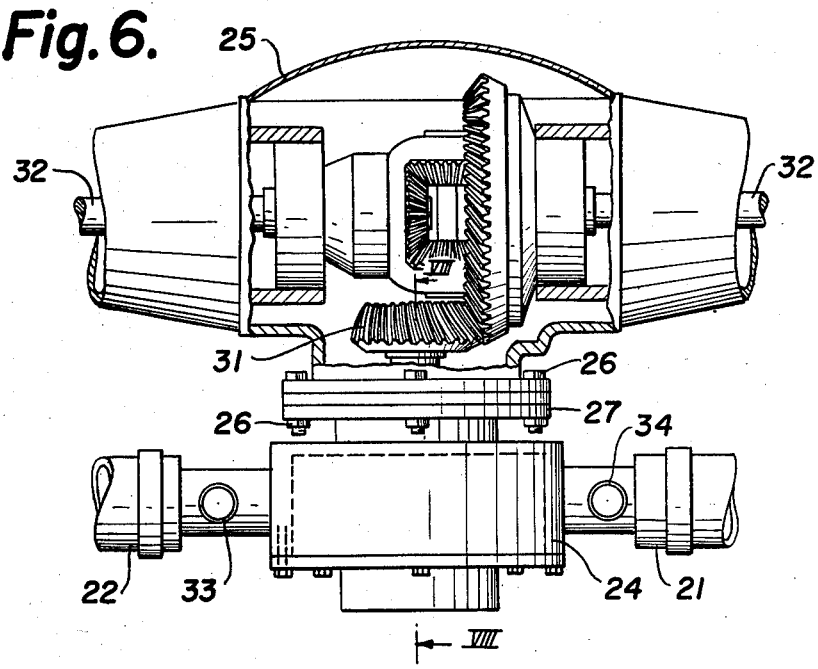
Fig. 6 is an enlarged plan view of the impeller casing and its connection to the differential housing of the vehicle.
Figure 7:
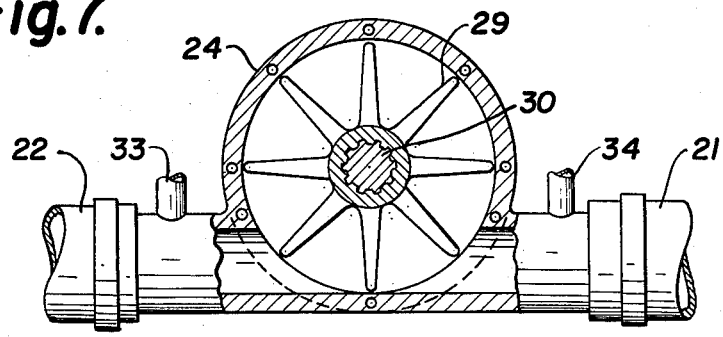
Fig. 7 is a sectional view showing the impeller of Fig. 6.
Figure 8:
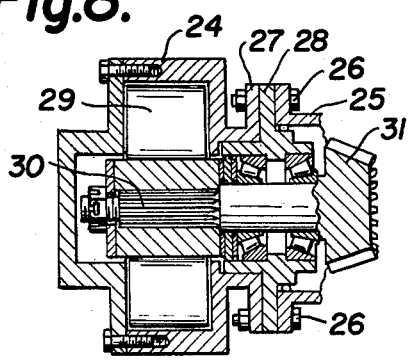
Fig. 8 is a view taken on the line VIII—VIII of Fig. 6.

The vehicle shown in Figs. 1 and 2 is one of a number of standard types, but with the conventional long drive shaft omitted therefrom, the power being transmitted from the drive shaft of the change-speed and reversing gears through a gear pump and pipe lines or conduits leading to an impeller casing at the differential gear housing.

A conventional form of automobile engine is indicated at the numeral 10, and conventional transmission gear and reversing gears at 11. The casing 12 is provided for a shaft 13 that usually transmits power from the transmission gearing to a universal joint which is here omitted. The shaft 13 has splined connection with the pump gear 14 that meshes with a companion pump gear 15, both of the gears being journaled in a pump casing 17 that is secured to the rear end of the gear casing 12 by screws 18 and bolts 19, and a collar 18a. The fluid system is kept filled with oil or other fluid introduced through filling pipes 20.

The gear pump operates in a manner usual in devices of this character, in that when the shaft 13 is driven in a clockwise direction, for example, and the gear wheel 15 in a counter-clockwise direction, fluid will be pumped from a conduit 21 into a conduit 22. When it is desired to reverse the direction of vehicle travel, the reversing gears in the transmission casing 10 will be set to drive the gear wheel 14 in a counter-clockwise direction thus directing oil from the conduit 22 to the conduit 21, under pressure.

The conduits 21 and 22 afford communication between the pump casing 17 and an impeller casing 24 that is secured to the housing 25 of differential gearing by bolts or screws 26, through a flange 27 and a bearing collar 28. An impeller 29 is rotatable in the casing 24 and has a splined connection with the shaft 30, of the differential pinion 31, the pinion 31 acting through the differential gearing that drives the usual rear axles 32. Flexibility is provided in the conduits 21 and 22, to permit of the usual relative vertical movements of the rear axles and the engine-block supports under usual traffic conditions.

In order to prevent excess pressure developing in the conduits 21—22 which might result in descending a hill for example, with the engine idling or the ignition not functioning, I provide a by-pass that comprises pipes 33 and 34 and a relief valve 35. This is for the purpose of avoiding damage to the tires or the differential gearing when the vehicle wheels are driving the impeller 29 with consequent building up of pressure in the gear pump that may become sufficient to prevent turning of the rear wheels.

The relief valve is provided with springs 36 and 37 that hold it in closed position when the impeller is being driven by the rear wheels in a direction to direct pressure into the conduit 22 and the pipe 33, and when such pressure exceeds the desired safety factor, the valve will open against the pressure of the spring 37 to short circuit the flow of fluid at the impeller 24 thus avoiding damage which might occur through resistance of the gear pump to such pressure. Contrariwise, if the impeller is driven in a direction to pump fluid into the conduit 21 and the pipe 34, the valve will be opened against the pressure of the spring 36. The springs will, of course, be of sufficient resistance to prevent flow through the by-pass 33—34 under normal driving conditions.

I claim as my invention:

The combination with a motor vehicle that has a motor-driven shaft and reversing gears therefor, and is also provided with a differential gearing for driving its rear axle, of a rotary compressor operable in either direction and driven by the said shaft, a rotary impeller having a shaft which is in driving engagement with the driving pinion for differential gearing, two pipes respectively leading from the sides of the compressor chamber into the sides of the impeller chamber, whereby fluid under pressure can be directed from either side of the compressor chamber into the impeller chamber to drive the impeller in either direction, and thence conducted from the impeller chamber into the other side of the compressor chamber, a by-pass conduit connecting the said two pipes at points intermediate the compressor and the impeller, a pressure-operated relief valve in the conduit and springs which hold the valve closed under normal operating conditions in the system, but which will open under excessive fluid pressure in either pipe, the impeller being capable of being driven by the rear axle and the differential gearing when the vehicle is traveling, to serve as a pump for circulating the fluid through the by-pass, when the compressor is ineffective to receive fluid at the rate it is being pumped by the impeller.

References Cited in the file of this patent

UNITED STATES PATENTS

| | | |
|---|---|---|
| 1,773,587 | Lape | Aug. 19, 1930 |
| 1,787,565 | Brown | Jan. 6, 1931 |
| 2,221,308 | Deschert | Nov. 12, 1940 |
| 2,393,882 | Blair | Jan. 29, 1946 |
| 2,468,828 | Kopp | May 3, 1949 |
| 2,614,499 | Mullins | Oct. 21, 1952 |
| 2,626,001 | Antle | Jan. 20, 1953 |
| 2,733,771 | Sullivan | Feb. 7, 1956 |